No. 845,072. PATENTED FEB. 26, 1907.
J. FISHER.
WIRE FENCE.
APPLICATION FILED DEC. 1, 1906.
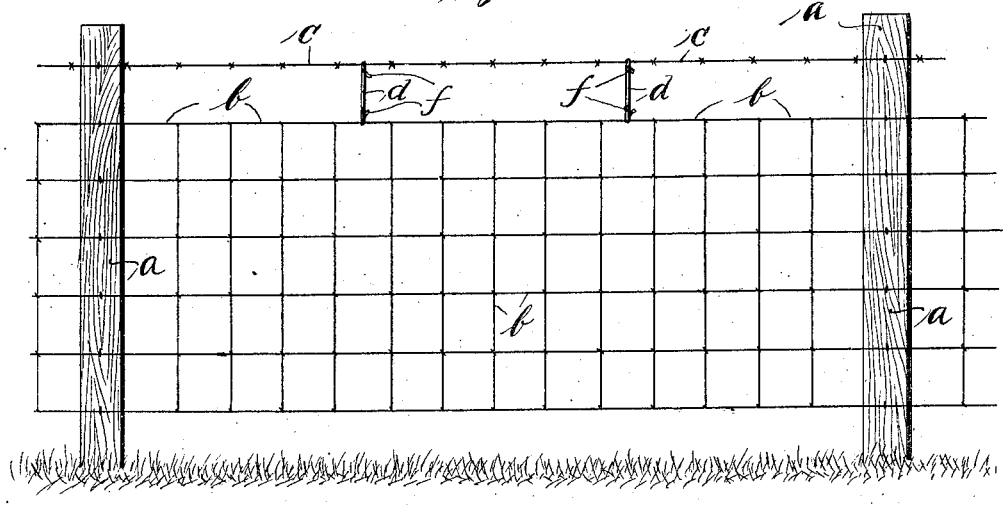
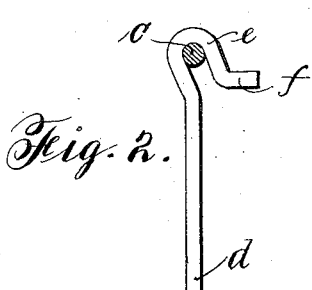
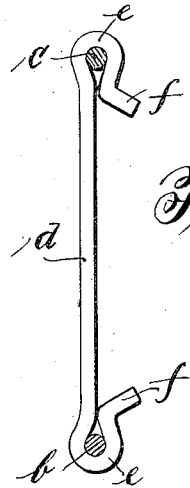
Witnesses
Lillian Hanson.
M. Hamilton.
Jacob Fisher, Inventor
By his Attorney James Hamilton

UNITED STATES PATENT OFFICE.

JACOB FISHER, OF SAC CITY, IOWA.

WIRE FENCE.

No. 845,072.  Specification of Letters Patent.  Patented Feb. 26, 1907.

Application filed December 1, 1906. Serial No. 345,897.

*To all whom it may concern:*

Be it known that I, JACOB FISHER, a citizen of the United States, residing at Sac City, in the county of Sac and State of Iowa, have invented certain new and useful Improvements in Wire Fences, of which the following is a specification, reference being had to the accompanying drawings.

My invention relates to improvements in wire-fence construction; and the object of my invention is to provide a wire fence of simple and effective construction which will prevent the stock from getting their heads through the wires and breaking down the fence.

A feature of my invention resides in the provision of a stay which may be readily applied and readily removed without any special tool.

In the drawings illustrating the principle of my invention and the best mode now known to me of applying that principle, Figure 1 is a front view of a wire fence built in accordance with my invention. Fig. 2 shows the stay before it is clenched around the wires, and Fig. 3 shows the stay after it is clenched around the wires.

The fence-posts $a$ support the woven wire $b$ and the barbed wire $c$. The portable stay $d$ is formed with a hook $e$ at each end, the hooks engaging the wires which are to be connected by it, as the barbed wire and the strand at the top of the woven wire. From the end of each hook projects a lug $f$, and this lug is an important feature of my invention. After the stay has been engaged with the wires the hooks $e$ are closed, as is shown in Fig. 3. In the closed position of the hooks the lugs $f$ project outwardly and form a means whereby the hooks may be opened by an ordinary pair of pliers.

I am aware of the patent to John Hewitt, No. 781,602, granted January 31, 1905, and disclaim all therein shown, for the hook of the Hewitt stay is not formed with a lug bent outwardly from the free end of the hook and adapted to be grasped by a pair of pliers, as is the free end of the hook of my stay.

I claim—

The combination with a pair of fence-wires, of a stay formed with a hook at each end, the free end of the hook being bent outwardly to form a lug which projects outwardly in both the open and closed position of the hook and is thereby adapted to be grasped by a pair of pincers in either of said positions.

JACOB FISHER.

Witnesses:
F. R. STEARNS,
EDWARD WELCH, Jr.